United States Patent
Lucarelli et al.

(10) Patent No.: US 7,223,810 B2
(45) Date of Patent: *May 29, 2007

(54) POWDER COATING COMPOSITION

(75) Inventors: Michael A. Lucarelli, McMurray, PA (US); David J. Fluck, Pesotum, IL (US); Lee C. Soule, Brookline, NH (US)

(73) Assignee: Cabot Corporation, Boston, MA (US)

( * ) Notice: Subject to any disclaimer, the term of this patent is extended or adjusted under 35 U.S.C. 154(b) by 968 days.

This patent is subject to a terminal disclaimer.

(21) Appl. No.: 09/839,762

(22) Filed: Apr. 20, 2001

(65) Prior Publication Data

US 2001/0020060 A1    Sep. 6, 2001

Related U.S. Application Data

(63) Continuation of application No. 09/232,310, filed on Jan. 15, 1999, now Pat. No. 6,228,927.

(60) Provisional application No. 60/071,609, filed on Jan. 16, 1998.

(51) Int. Cl.
*C08K 3/18* (2006.01)
*C08K 3/22* (2006.01)
*C08K 3/34* (2006.01)

(52) U.S. Cl. ............... 524/430; 524/431; 524/432; 524/433; 524/492; 524/493; 524/497

(58) Field of Classification Search ............ 524/430, 524/492, 497, 493, 431, 432, 433, 251, 262, 524/263, 267
See application file for complete search history.

(56) References Cited

U.S. PATENT DOCUMENTS 6,228,927 B1 *   5/2001   Lucarelli et al. ............ 524/493

* cited by examiner

*Primary Examiner*—Nathan M. Nutter (57) ABSTRACT

A composition suitable for use in a powder coating process comprising a powdered polymer composition and a metal oxide based fluidization enhancer, or a metal oxide based flatting agent.

23 Claims, 8 Drawing Sheets

POWDER COATING COMPOSITION

This application is a continuation of non-provisional U.S. application Ser. No. 09/232,310, filed Jan. 15, 1999, now U.S. Pat. No. 6,228,927 which claims the benefit of U.S. Provisional Application Ser. No. 60/071,609, filed Jan. 16, 1998, the specifications of which are incorporated in their entireties by reference.

BACKGROUND OF THE INVENTION (1) Field of the Invention

This invention concerns powder coating compositions and particularly powder coating compositions that have improved fluidization properties as a result of including a small amount of a metal oxide fluidization enhancer in the composition. This invention is also a powder coating composition that includes a small amount of a novel metal oxide gloss reducing agent.

(2) Description of the Art

Polymer based powder coatings are solid particulate compositions which are generally applied to substrates to give the substrate a tough durable surface coating. Powder coatings are applied to substrates by electrostatic, corona, or tribocharge spray process in which the powder coating particles are electrostatically charged by the spray gun and the substrate is grounded or oppositely charged. The applied powder coating is then heated to melt and fuse the particles into a continuous coating and to cure the resulting coating. The powder coating particles which do not adhere to the substrate can be recovered for re-use. Powder coating compositions are generally free of added solvents and, in particular, do not use organic solvents and accordingly are nonpolluting.

Powder coating compositions generally comprise a solid film-forming resin, usually with one or more coloring agents such as pigments. They are usually thermosetting, incorporating, for example, a film forming polymer and a corresponding curing agent (which may itself be another film-forming polymer). Powder coating compositions are generally prepared by intimately mixing the ingredients, for example in an extruder, at a temperature above the softening point of the film-forming polymer(s) but below a temperature at which significant polymerization would occur. The extrudate is usually rolled into a flat sheet and reduced in size, for example, by grinding, to the desired particle size. The particle size distribution required for most commercial electrostatic spray apparatus is between 10 and 120 microns, with a mean particle size within the range of 15 to 75 microns, and preferably 25–50 microns. Examples of powder polymer coating compositions are disclosed in U.S. Pat. Nos. 5,461,089, 5,470,893, 5,614,323 and 5,229,460.

Powder polymers cure to a glossy finish. In some applications, however, gloss reduction to gloss is desired. Gloss reduction is typically achieved in powder paints by adding large inert particles known as "texturing agents" to the compositions. The texturing agents become encased in the cured polymer film and are large enough to give the final finish a rough appearance. Examples of large inert texturing agents include fibers, pigments, mica and abrasives, such as those disclosed in U.S. Pat. No. 5,470,893.

Powder polymer coating compositions are also difficult to fluidize and to keep free flowing during their delivery, application, and use because of the tendency of powder polymer coatings to cake, become compacted, and to agglomerate during storage, reclaim, and handling. The problem with fluidization is becoming more predominant as the particle size of the powder polymer compositions decrease.

Traditionally it has been typical to use precipitated or gelled silicas as free flow additives, particularly to larger particle size powder coatings. Precipitated silicas and gelled silicas are believed to enhance the free flow of powder polymer compositions due to their ability to absorb moisture in the form of water vapor or liquid which minimizes liquid bonding and liquid-liquid bridging between the powdered polymer particles. However, with smaller and smaller powdered polymer particles becoming the norm, improved additives that adsorb moisture and/or that enhance powder polymer performance are needed.

While existing powder coating compositions are satisfactory in many respects, there nevertheless exists a need for powdered polymer coating compositions that produce a low gloss finish. It is an objective of the present invention, therefore to provide a reduced gloss powdered coating composition. There is also a need for new fluidization enhancer compositions that can be combined with powdered polymer compositions, and especially with small particle size powdered polymer compositions in order to enhance powder polymer performance.

SUMMARY OF THE INVENTION

This invention is a powder coating composition that includes at least one solid, particulate fluidization enhancer that improves powdered polymer performance.

This invention also is a powder coating composition including fluidization enhancer which reduces the gloss of the cured polymer film.

Further, this invention is a powder coating composition that includes a gloss reducing agent that liberates gas during the curing step to reduce the gloss of a cured polymer film layer.

Still another aspect of this invention is a polymer composition that cures to give a thin uniform finish.

In one embodiment, this invention is a powder coating composition. The powder coating composition comprises at least one powdered polymer, and at least one metal oxide having a mean particle size of less than about 25 microns In another embodiment, this invention is a powder coating composition. The composition comprises from about 99.5 to about 99.9 wt % powdered polymer, and from about 0.1 to about 0.5 wt % of a fumed silica having a mean particle size less than 10 microns that has been modified with hexamethyldisilazane.

In still another embodiment, this invention is a powder coating composition that includes at least one powdered polymer and the non-deammoniated product of the admixture of particles of at least one metal oxide and hexamethyldisilazane.

DESCRIPTION OF THE FIGURES

FIGS. 1–8 are Scanning Electron Microscope (SEM) evaluations of two powder coatings each of which has been combined with: (1) no additive, i.e., virgin material; (2) Composition 1—is a 120 $m^2/g$ surface area fumed silica that has not been subjected comminution; (3) Composition 2—a partially dimethyldichlorosilane treated fumed silica having a surface of area 120 $m^2/g$ that has not undergone comminution; and (4) Composition 3—a jet milled reaction product of fumed silica having a surface area of 200 $m^2/g$ and about 5.0 wt % HMDZ and 4.0 wt % water where the fumed silica has a mean particle size of about 10 microns.

In the Figures:

Figure 1:
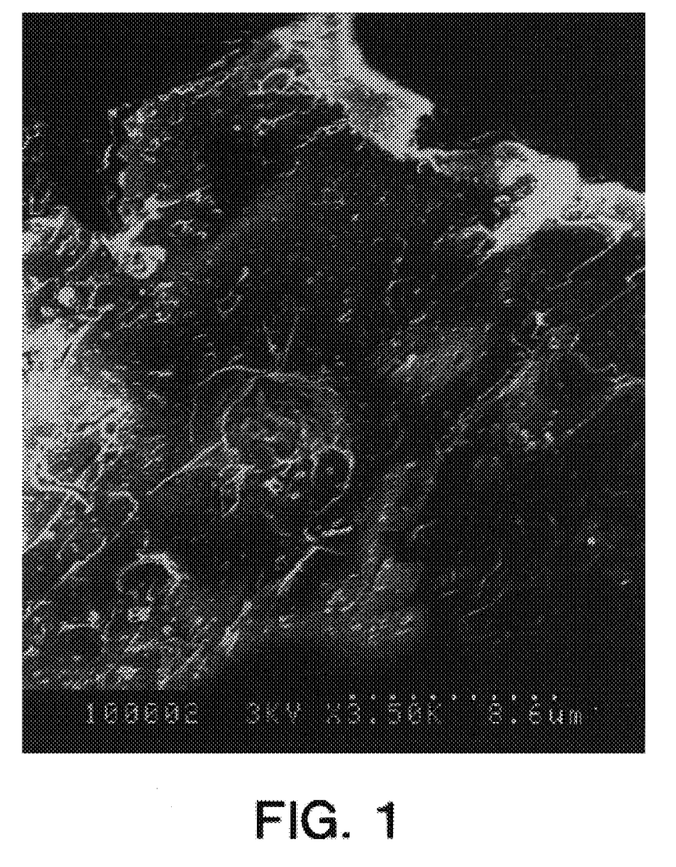
FIG. 1 is a SEM photograph of a virgin polyester powdered polymer manufactured by Tiger-Drylac®.
Figure 2:
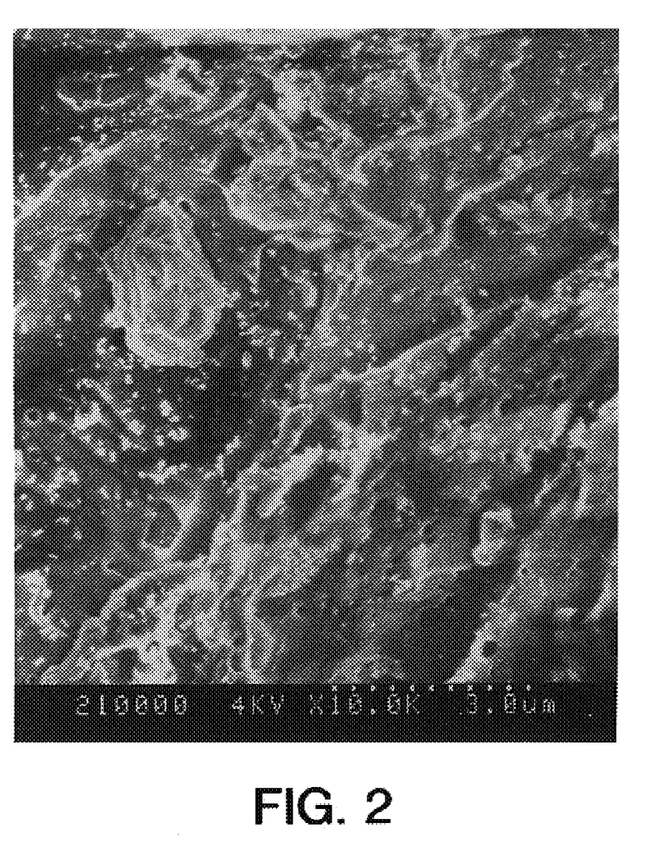
FIG. 2 is a SEM photograph of the polyester powdered polymer described in FIG. 1 coated with Composition 1.
Figure 3:
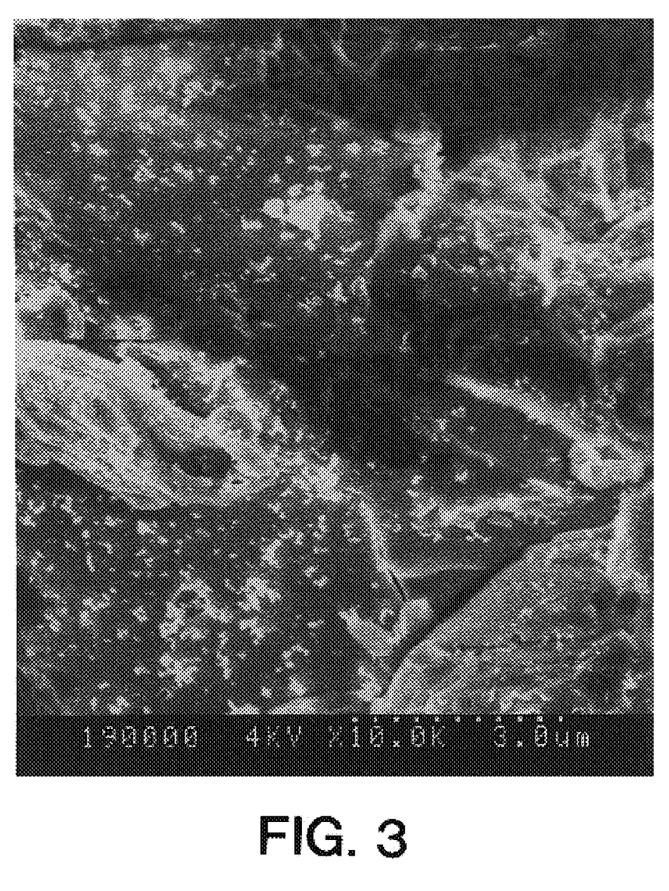
FIG. 3 is a SEM photograph of the polyester powdered polymer described in FIG. 1 coated with Composition 2.
Figure 4:
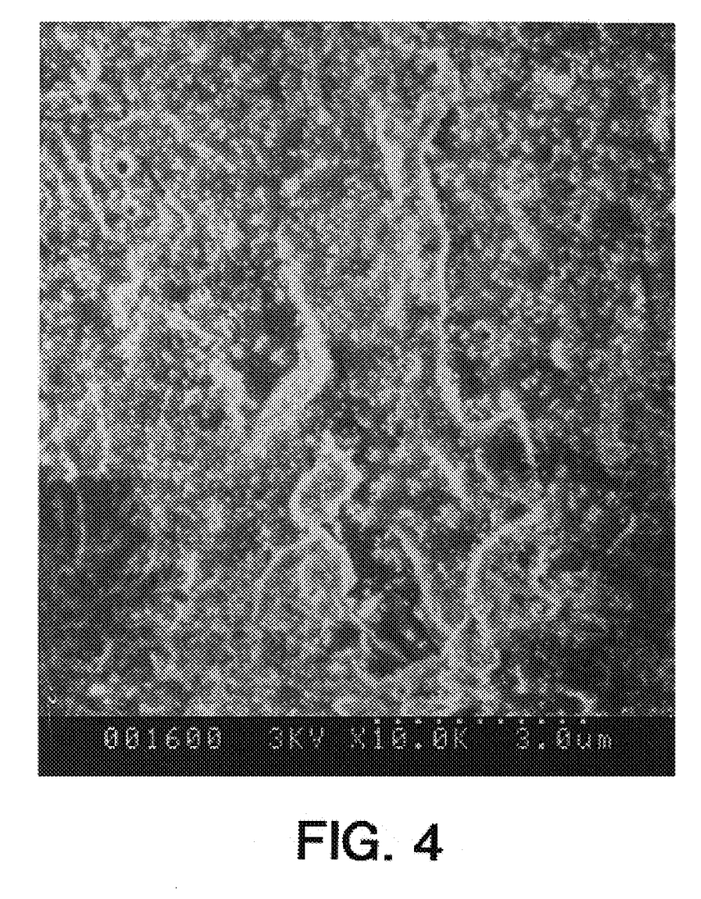
FIG. 4 is a SEM photograph of the polyester powdered polymer described in FIG. 1 coated with Composition 3.
Figure 5:
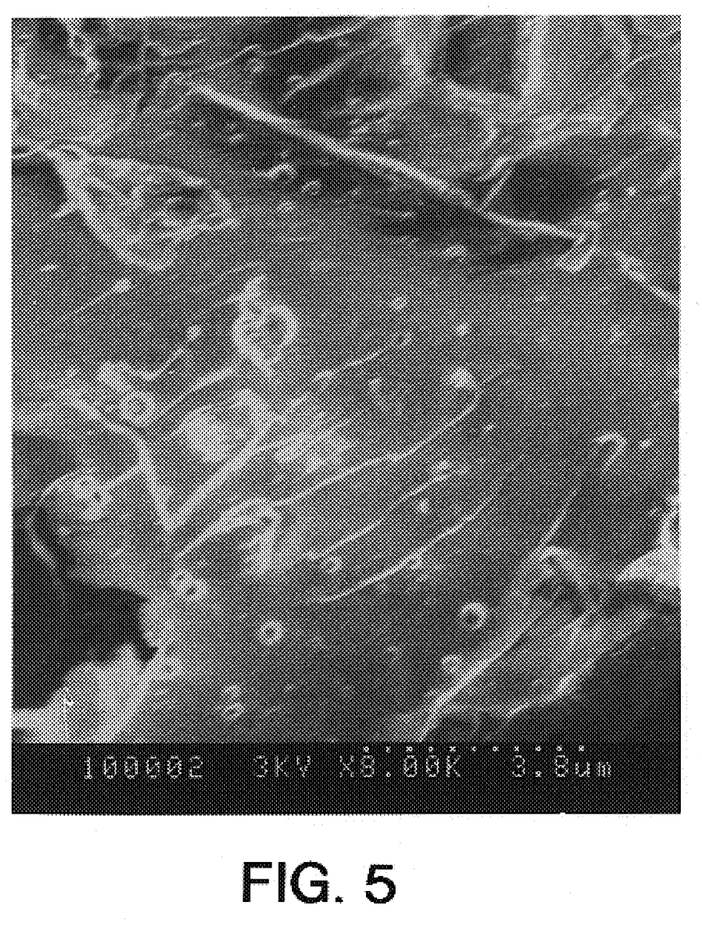
FIG. 5 is a SEM photograph of a virgin hybrid powdered polymer mixture of polyester and epoxy manufactured by Tiger-Drylac®.
Figure 6:
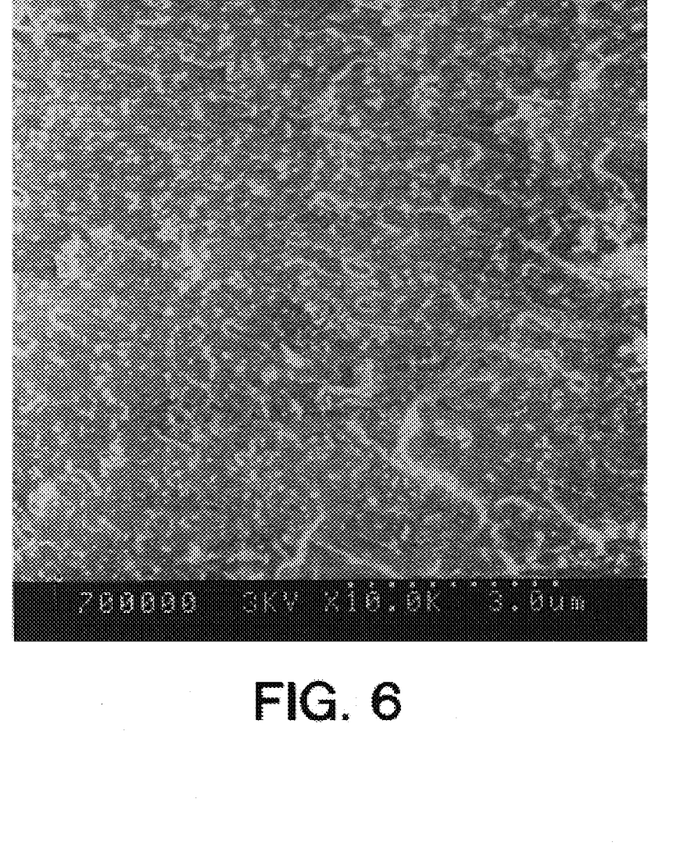
FIG. 6 is a SEM photograph of the hybrid powdered polymer described in FIG. 5 that has been coated with Composition 1.
Figure 7:
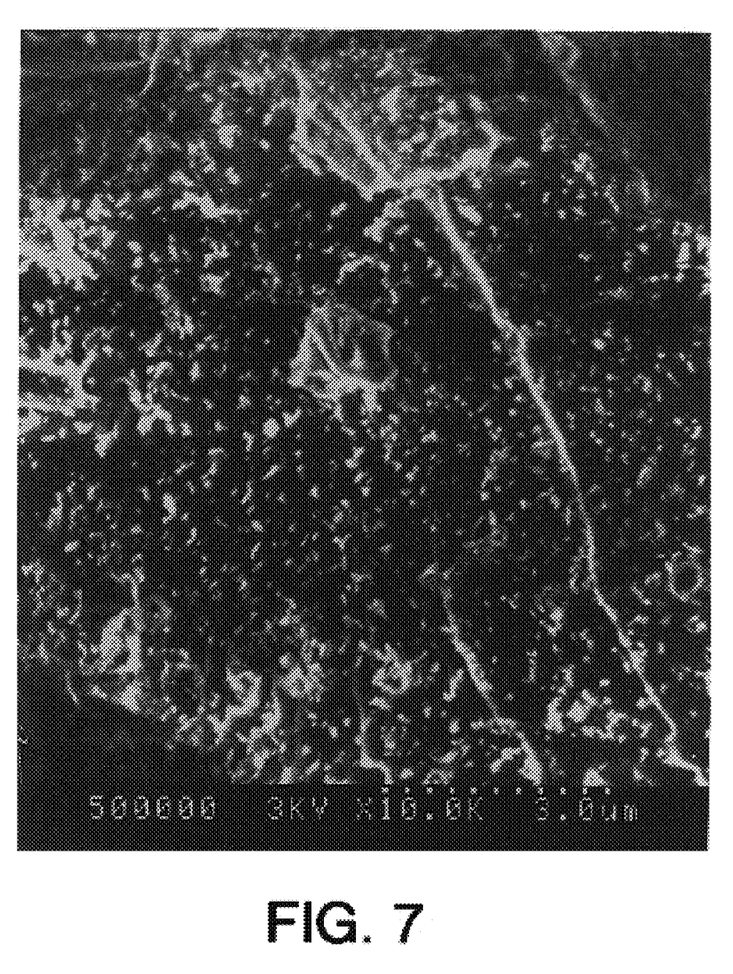
FIG. 7 is a SEM photograph of the virgin hybrid powdered polymer described in FIG. 5 that has been coated with Composition 2.
Figure 8:
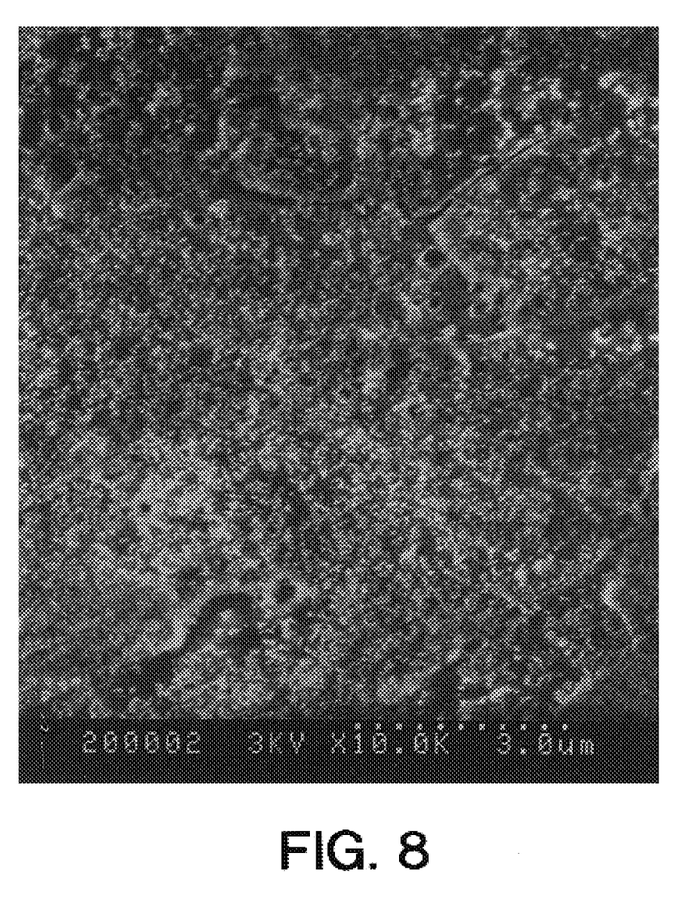
FIG. 8 is a SEM photograph of the virgin hybrid powdered polymer described in FIG. 5 coated with Composition 3.

FIGS. 1 and 5 show uncoated virgin powdered polymers. FIGS. 2, 3, 6, and 7 each show that the distribution of non-communited agglomerated fumed silica across a conventional particle size (30–40 microns psd) powder coating is only somewhat uniform, with a tendency to see concentrated clusters of silica in one area and larger areas of insufficient distribution. In contrast, FIGS. 4 and 8 show that a size-reduced fumed silica fluidization enhancer is able to become distributed uniformly over the entire polymer particle surface thereby promoting powder polymer fluidization even at very low loading levels.

DESCRIPTION OF THE CURRENT EMBODIMENT

The present invention relates to powder coating compositions including a novel fluidization enhancer, a novel gloss reducing agent or both. The fluidization enhancers useful in the composition of this invention promote efficient fluidization of powdered polymers of all particle sizes. The novel gloss reducing agent reduces the gloss of the cured films prepared using powdered polymer coating compositions.

The powder coating composition of this invention includes at least one powder polymer. Powder polymers useful in the composition of this invention include any powdered polymers that are useful in electrostatic spray coating techniques. Non-limiting examples of useful powered polymers include, but are not limited to carboxy-functional polyester resins, functional acrylic resins, epoxies, polyurethanes, polyolefins, PTFE, nylons, co-polymers and mixtures thereof. Further, examples of powder coating compositions are disclosed in U.S. Pat. Nos. 5,461,089, 5,229,460 and 4,122,060, which are each incorporated herein by reference.

The powder coating compositions of this invention will include from about 90.0 to about 99.9 wt % of at least one powered polymer, and preferably from about 98.0 to about 99.95 wt % of a powder polymer. The term "powdered polymer" as used herein refers to a single powdered polymer, to mixtures of powdered polymers, to co-polymers, and to powdered polymers including additives, that are useful in powder coating compositions. Additives which may be incorporated into the "powdered polymer" include, for example purpose only, additives that reduce entrapped air or volatiles, catalysts to promote the polymerization reaction, stabilizers, pigments, and dyes. Each of these "powdered polymers" are also commonly referred to a powder coatings and powder coating formulations. Although it is possible to cure or cross-link the powdered polymer composition without the use of a catalyst, it is usually desirable to employ a catalyst to aid the cross-linking reaction.

Both the fluidizing enhancers and the gloss reducing agents useful in the powdered coating compositions of this invention include particulate metal oxides. Metal oxides that are useful in the present invention are selected from the group silica, alumina, ceria, germania, titania, zirconia, zinc oxide and mixtures thereof. The useful metal oxides may be naturally occurring, or they may be manufactured. In addition, the metal oxides may be a mixed or co-produced product containing two or more types of metal oxides. The metal oxide may be produced utilizing techniques known to those skilled in the art. For example, the production of a fumed metal oxide is a well-documented process which involves the hydrolysis of suitable feed stock vapor (such as silicon tetrachloride for fumed silica) in a flame of hydrogen and oxygen. Molten particles are formed in the combustion process, the size of which are varied through process parameters. These molten particles, typically referred to as primary particles, fuse with one another by undergoing collisions at their contact points to form branched, three dimensional chain-like particles. Preferably, the metal oxides are precipitated, fumed, co-precipitated, or co-fumed materials or gel processed materials including, for example, aerogels, silica-gels, xerogels, and the like.

The formation of metal oxide particles is considered to be irreversible as a result of the fusion between the primary particles. During cooling and collecting, the particles undergo further collisions that may result in some mechanical entanglements to form agglomerates. These agglomerates are thought to be loosely held together by van der Waals forces and can be reversed, i.e. de-agglomerated, by proper dispersion in suitable media.

The manufacture of gel based metal oxide materials, e.g. aerogels, xerogels, hydrogels and other gels, is well known to those skilled in the art and may be accomplished utilizing conventional techniques, for example, U.S. Pat. No. 3,652,214 to Aboutboul, et al., U.S. Pat. No. 5,270,027 to Balducci, et al., U.S. Pat. No. 2,188,007 to Kistler, and as disclosed in the article by Heley, et al., entitled "*Fine Low Density Silica Powders Prepared by Supercritical Drying of Gels Derived From Silicon Tetrachloride,*" Journal of Non-Crystalline Solids, 186, 30–36 (1995), the disclosures of which are incorporated herein in their entirety by reference.

The size of the primary spherical particles that comprise the metal oxide particles determines the surface area. The surface area of the metal oxides may be measured by the nitrogen adsorption method of S. Brunauer, P. H. Emmet, and I. Teller, J. Am. Chemical Society, Volume 60, Page 309 (1938) and is commonly referred to as BET. Typical BET values for metal oxides range from 40 $m^2/g$ to about 1000 $m^2/g$, preferably between 50 $m^2/g$ to about 400 $m^2/g$.

Although many commercially available metal oxides are suitable for use as the inert carrier according to this invention, it is preferred that the metal oxide is silica. The silica used should have a surface area of from about 25 $m^2/g$ to about 400 $m^2/g$ and preferably from about 150 $m^2/g$ to about 350 $m^2/g$. In particular, CAB-O-SIL® fumed silica having a surface area between about 50 $m^2/g$ to about 350 $m^2/g$, available from the Cab-O-Sil Division of Cabot Corporation, Tuscola, Ill., is a preferred silica.

If the metal oxides used as fluidization enhancers are manufactured as aggregates, then the aggregate metal oxides are preferably at least partially sized-reduced meaning that the mean particle size of the metal oxide is reduced by at least 25% as a result of a comminution process. It is more preferred that the useful metal oxide will have a mean particle size that is reduced by comminution by at least 50%. In addition, the fluidization enhancer may consist of at least partially size-reduced particles of a single metal oxide compound or it may be a mixture of partially of several metal oxide compounds.

The metal oxide fluidization enhancer should also have a mean particle size that is significantly smaller than the powder polymer particular size. By significantly smaller, the mean particle size should be less than or equal to one-sixth the average powdered polymer particle mean size, and preferably less than or equal to one-tenth of the size.

The preferred metal oxide particle useful as fluidizing enhancers are preferably manufactured to have a mean particle size less than about 25 microns. It is preferred that the mean particle size of the metal oxide fluidization enhancer is about 15 microns or less, and most preferably less than about 1.0 microns.

The term "particle" as used in the term mean particle size refers to primary particles of metal oxides, aggregates of metal oxide particles, and agglomerates of metal oxide aggregates.

The term "metal particle size" refers not to the size of a single particle but to the weighted average of a sample of multiple many particles analyzed using a Microtrac X-100 manufactured by Leeds & Northrup Co., St. Petersburg, Fla.

A most preferred fluidization enhancer is a treated at least partially size reduced fumed silica. Fumed silica particles are typically agglomerates of two or more fumed silica aggregates, some of which are quite large. Therefore size-reduction via a comminution eliminates the very large agglomerates and significantly reduces the mean particle size of the resulting fumed silica.

The metal oxide particles useful as fluidization enhancers may, if necessary be size-reduced by any communiting method known in the art including methods such as grinding or milling are employed to produce size-reduced fumed silica.

The metal oxide particles may be subjected to comminution utilizing conventional size reduction techniques to reduce and narrow the mean particle size of the metal oxide. Suitable equipment includes, for example, ball mills, grinders, jet mill, pin mills, and the like. It is most preferred that the fumed silica agglomerates are jet milled to produce a size-reduced fumed silica. When incorporated into a powder polymer composition, the metal oxide fluidization enhancer reduces the compressibility and increase the aerated bulk density of the resulting powder coating composition thus ensuring excellent fluidization and fluidability during the life the product. The ability of the powdered polymer compositions including a fluidization enchancer to flow freely and predictably positively impacts the first past transfer sufficiency of the resulting powder polymer composition. In addition, the fluidization enhancer promotes uniform application of the resulting powder polymer composition to a substrate. The role of the fluidization enhancer of this invention is to modify the material flow characteristics of powder polymer compositions. Although known to be important, this is only partially understood. What is understood, however, is the end result—the small metal oxide fluidization enhancer composition of this invention positively influences the powder polymer particle-particle interactions and make their additions to high performance powder coating formulations advantageous.

Only a very small amount of fluidization enhancer—enough to uniformly coat each powdered polymer particle—is needed to enhance fluidization of a powdered polymer. The powdered coating compositions of this invention will include from about 0.01 to about 3.0 wt % of a metal oxide fluidization enhancer. More preferably, the powder polymer composition of this invention will include from about 0.05 to about 1.0 wt %, and most preferably from about 0.05 to about 0.5 wt % of a metal oxide fluidization enhancer.

The metal oxide particles useful as fluidization enhancers may be unmodified or modified prior to being combined with a powdered polymer. The modifying agent may be any compound that is useful in metal oxide fluidizing enhancer. The type of treated agent chosen and level of treatment will vary depending up the characteristic sought such as hydrophobicity or gloss reduction. Useful modifying agents include, for example, modifying hydrophobic treating agents such as organopolysiloxanes, organosiloxanes, organosilazanes, organosilanes, halogenorganopolysiloxanes, halogenorganosiloxanes, halogenorganosilanes, such as dimethyldichlorosilane, trimethyoxyoctylsilane, hexamethyldisilazane, and polymethylsiloxane.

Metal oxide aggregate modification may be achieved by dry or wet techniques that are well known in the art. For example, a dry treatment method may include stirring or mixing the metal oxide and modifying agent in a fluidized bed reactor. Alternately, a wet treatment method may include dispersing the metal oxide into a solvent to form a metal oxide slurry, and adding the modifying agent to the slurry to thereby modify the metal oxide surface with the modifying agent. In addition, a modified metal oxide may be prepared using a batch or continuous process wherein the dry metal oxide is contacted with a liquid or vapor modifying agent with sufficient mixing. In another method, the modified metal oxide is held for a period of time at a temperature sufficient to modify the surface of the properties of the metal oxide and thereby render modified metal oxide hydrophobic. Typically, a temperature range of form about 25° C. to about 200° C. for a time period of from 30 minutes to about 16 hours or more is suitable. Examples of metal oxide modifying methods are described in U.S. Pat. Nos. 5,133,030, 4,307,023, 4,054,689 which are each incorporated by reference herein.

The metal oxide fluidization enchancer useful in the compositions of this invention preferably includes a volatilizable modifying agent. The volatilizable modifying agent may be any composition that is capable of being combined with a metal oxide at standard temperatures and pressures and which is at least partially volatilized to form a gas or as vapor when the metal oxide is heated to a temperature above room temperature. The liberated vapor reduces the gloss of the cured powdered polymer. Examples of useful volatilizable modifying agents are water, ammonia, volatilizable hydrocarbons, gases such as CO, He, and Ar, and compounds that decompose upon heating and/or upon the addition of moisture to liberate gaseous reaction products. A most preferred volatilizable modifying agent is hexamethyldisilazane. The volatilizable modifying agent is applied to metal oxide particles of this invention by the methods described above.

The optional volatilizable modifying agent should be present in the metal oxide fluidization enhancer in an amount sufficient to obtain the desired cured polymer gloss reduction. The metal oxide will, therefore, be the reaction product of a metal oxide combined with from about 0.05 to about 40.0 wt % of a volatilizable modifying agent, and preferably combined with from about 0.2 to about 10 wt % of a volatilizable modifying agent using one of the methods described above.

A most preferred fluidizing enhancer composition is size-reduced fumed silica that has been modified with hexamethyldisilazane.

It has been found that metal oxide particles are also useful in gloss reducing agents. Thus another separate embodiment of this invention is a powdered polymer composition including a gloss reducing agent that is the reaction product of metal oxide particles, preferably fumed silica, and hexamethyldisilazane that has not been deammoniated. The metal oxide particles useful in the gloss reducing agent may comprise any of the metal oxides described above.

When hexamethyldisilazane is combined with metal oxide particles, such as particles of fumed silica, the hexamethyldisilazane reacts with the metal oxide in a manner that causes the silane portion of the hexamethyldisilazane to bind to the metal oxide and liberate ammonia is a by-product of the reaction. At least a portion of the ammonia by-product remains associated with the metal oxide particles where it remains until the metal oxide particle is heated to a temperature above room temperature, such as to powder polymer curing temperatures. Alternatively, the ammonia by-product can be liberated from the metal oxide particle by exposing the metal oxide particle surface to water which liberates ammonia from the metal oxide particle.

If a gloss reducing agent comprising the reaction product of a metal oxide and hexamethyldisilazane is heated before it is combined with a powdered polymer, much of the ammonia associated with the particle will volatilize to give a "deammoniated" gloss reducing. A deammoniated gloss reducing agent is less useful than a non-deammoniated gloss reducing agents. The preferred gloss reducing agent of this invention comprises the non-deammoniated reaction product of metal oxide particles and hexamethyldisilazane which has not been heated to a temperature greater than 50° C. Such metal oxide particle/hexamethyldisilazane reaction products are defined herein as being "non-deammoniated."

The preferred gloss reducing agent of this invention, the product of the reaction of metal oxide particles and hexamethyldisilazane, is preferably the non-deammoniated product of the combination of from about 0.1 to about 40 wt % hexamethyldisilazane with from about 60 wt % to about 99.9 wt % of a particulate metal oxide.

The magnitude of gloss reduction achieved using gloss reducing agents of this invention will vary depending upon the amount of hexamethyldisilazane associated with the metal oxide particles and upon the weight amount of gloss reducing incorporated into the powder polymer composition. In addition, the magnitude of gloss reduction is dependent upon the powder polymer used. Acceptable gloss reduction results are obtained when the powder coating compositions of this invention include from about 0.1 to about 5.0 wt % of a gloss reducing agent. More preferably the powder coating compositions will include from about 0.2 to about 2.0 wt % of a gloss reducing agent.

The mean particle size of the metal oxides used in the gloss reducing agent is not critical. It is important, however, that the mean particle size of the metal oxide particles are not so large as to cause matting due to their size. Therefore, the mean particle size of the metal oxide particles used in the gloss reducing agent should be equal to or smaller in size than the mean particle size of the powdered polymer. Most preferably the mean particle size of the metal oxide particles corresponds is less than about 25 micros and preferably less than about 15 microns.

The powder polymer compositions of this invention including a gloss reducing agent or a fluidization enhancer may be prepared by several different methods. In one method, the powdered polymer may be combined with finely divided particles of a gloss reducing agent or with a fluidization enchancer, or both, to give a powder polymer composition of this invention. Alternatively, the gloss reducing agent or the fluidization enhancer may be combined with the polymer chips after which the powder/chip mixture is ground to give a heterogeneous powdered coating composition comprising powder polymer and additive.

Following, the grinding step, the resulting powdered polymer composition may, if desired or required, be sieved to remove particles having a particle size greater than a particular value. If, for example, a powder coating product is required, powdered polymer particles having a particle size greater than about 120 microns are preferably removed. The powdered polymer particle size will depend on the application, but typically the powdered polymer will have a particle size ranging from 10 to about 90 microns, more preferably about 10 to about 65 micros and most preferably form about 10 to about 40 microns.

It is preferred that the compounds of this invention are prepared by combining a gloss reducing agent or a fluidizing enhancer with polymer chips and thereafter grinding the mixture into a powdered polymer composition.

The compositions of this invention may be applied to a conductive metal surface by any method known in the art for applying a powdered polymer composition to a metal surface, e.g., using electrostatic spray apparatus, a cloud chamber, a fluidized bed, or triboelectric coating apparatus. The preferred method is corona spraying in which a voltage is applied to the spray gun. The composition can be applied in either one pass or in several passes to provide variable polymer powder thickness depending upon the desired end-use of the coated article.

After the application of the powder coating composition of this invention to a conductive surface, the coated surface is heated to a temperature sufficient to cure the powder polymer into a coherent coating layer. The curing temperature will vary depending upon the type of powdered polymer used in the composition. Curing temperatures may range from about 100° C. to as high as about 800° C. The powder coated surface should be exposed to curing temperatures for enough time to cure the powder particles into a substantially continuous uniform coating. Typically, a curing time of from about 1 to about 10 minutes or more is necessary to convert the powdered particles into a substantially continuous uniform coating. It is preferred that the powder coating compositions of this invention are applied to a conductive surface, and thereafter cured to give a cured polymer coating of from about 0.8 to about 4.0 mils, and preferably from about 0.8 to 1.5 mils.

While the present invention has been described by means of specific embodiments, it will be understood that modifications may be made without departing from the spirit of the invention. The scope of the invention is not to be considered as limited by the description of the invention set forth in the specification and examples, but rather as defined by the claims.

EXAMPLE 1

This Example describes the method used herein for determining mean particle size of metal oxide particles using a Honeywell Microtrac X-100.

In order to determine sample mean particle size, a 1 to 9 mixture of Triton X-11:DIH$_2$O is used to make dispersions of the treated silica sample. The deionized water is heated and stirred to facilitate the solution of the Triton X-100. 20 ml of the Triton X-100/DI solution is placed in a beaker when used to displace treated silica and a 50 ml solution of DIH$_2$O is placed in a beaker and used to disperse untreated silica. 0.5 grams of silica is added to the appropriate beaker and mixed on a stir plate until dispersed in a solution. When treated silica is being dispersed, 30 ml of DIH$_2$O is added to the sample to bring total of volume of the sample to 50 ml. Once the sample dispersions are prepared, the samples are added to the Honeywell Microtrac X-100 and analyzed for mean particle size.

EXAMPLE 2

This example describes the basic method for preparing HMDZ modified fumed silica. 500 grams of silica was added to a large plastic bag in three or four increments. After each increment of silica, an appropriate amount of water was added to give a final desired quantity. After all the water was added, the bag was sealed and shaken manually for several minutes. The silica was then allowed to stand overnight. The silica-water mixture was then transferred another plastic bag in three increments. After each increment was added to the bag, ⅓ the required amount of hexamethyldisilazane was added to the mixture. After all the silica was transferred and the hexamethyldisilazane added, the bag was sealed and manually shaken for several minutes. This mixture was then allowed to stand overnight.

The HMDZ modified silica used in Examples 3A, 3B, and 3H, below, were prepared using 4 wt % water and 8 wt % hexamethyldisilazane in the above method. The HMDZ modified fumed silicas used in Examples 3C, 3F, and 3G, below, were prepared by using 8 wt % water and 10 wt % hexamethyldisilazane in the above method.

EXAMPLE 3

This Example describes methods for incorporating additives, including fumed silica containing gloss reducing agents of this invention into commercial polymer powder coating compositions and then curing the powders.

The powder coatings and fumed silica were mixed via a twin shell blender equipped with an intensifier bar. The twin shell mixer was a four quart model LB-3699, made by Patterson-Kelly of East Stroudsburg, Pa. The powder coating-silica mixture was applied to a grounded conductive substrate, by a Nordson (Amhurst, Ohio) Versa-Spray II IPS controller and corona manual powder spray gun. The coated conductive substrate was baked at 392° F. in a Blue M Economy class "A" batch oven, made by Blue M of Blue Island, Ill. The gloss measurements were made using a micro-TRI-gloss reflectometer made by BYK Gardner of Geretsried, Germany. The incident angle of light was at 60 degrees. The film thickness was generally targeted between 1.5 and 2 mils.

Baseline gloss measurements were taken for two powdered polyester compositions for comparison purposes. The polyesters used were both manufactured by Tiger-Drylac, Inc, of Austria. The polyesters used and gloss measurements are as follows: TGIC Polyester 39/80040 the gloss measurement is 55 with a smooth glossy finish and low orange peel. With TGIC Polyester 39/80010 the gloss measurement was 85 with a smooth glossy finish and slight orange peel.

EXAMPLE 3A 0.5% by weight of a gloss reducing agent consisting of a non-deammoniated HMDZ containing fumed silica having a surface area of 200 m$^2$/g was combined with 99.5 wt % TGIC Polyester 39/80040 according to the method described in Example 1 and evaluated for gloss.

The resulting gloss measured 30 corresponding to a gloss reduction of 54.5% in comparison to the virgin powdered polymer. The finish was medium orange peel with a slight texture.

The non-deammoniated silica gloss reducing agent used in this Example was produced by reacting fumed silica with hexamethydisilazane as described in Example 2.

EXAMPLE 3B 1.0 wt % of the non-deammoniated gloss reducing agent prepared according to the method described in Example 3A was combined with 99.0 wt % TGIC Polyester 39/80040 according to the method described this Example and evaluated for gloss. The gloss measurement was 0.5, representing a 99.5% gloss reduction in comparison to the virgin material. The finish had a textured appearance.

EXAMPLE 3C

The non-deammoniated gloss reducing agent prepared according to the method of Example 3A was deammoniated by transferring the non-deammoniated silica to an appropriately sized shallow container and covered with aluminum foil. Slits were made in the foil to allow gasses to escape. The container was placed in an air circulating oven and heated overnight at 125 C. Once the container was removed and cooled, the silica was collected.

1.0 wt % of the resulting deammoniated HMDZ treated fumed silica was combined with 99.0 wt % TGIC Polyester 39/80040 according to the method described in Example 3 and evaluated for gloss. The resulting gloss measured only 9.1 representing a significant increase in gloss in comparison to the non-deammoniated gloss reducing agent.

EXAMPLE 3D 1.0 wt % of a powdered polymer additive consisting of undried untreated hydrophilic fumed silica having a surface area of 200 m$^2$/g and a mean size of about 30 microns was combined with 99.0 wt % TGIC Polyester 39/80040 according to the method described in Example 1 and evaluated for gloss. The gloss measurement was 30, representing a reduction of 54.5%. The finish had a very rough surface of poor quality due to the presence of silica particles on the surface.

EXAMPLE 3E

This example used the same powdered polymer compositions as Example 3D except the fumed silica was dried overnight at 110° C. to remove any volatiles, and then tested immediately. This silica exhibited a 0.8% weight loss on drying. The resulting gloss measurement was 54.5, representing a 0.1% reduction. The reason for the significant decrease in gloss from Example 3D is believed to be due to the removal of water from the M5 silica before use in this Example. The finish had a very rough surface of poor quality due to the presence of silica particles on the surface.

EXAMPLE 3F

The deammoniated gloss reducing agent used in Example 3C was exposed to a saturated ammonia environment overnight by placing 100 grams of the gloss reducing agent in a closed jar. 0.5 wt % of the ammonia post-treated gloss reducing agent was combined with 99.5 wt % TGIC Polyester 39/80010. The resulting gloss measurement was 38.8, representing a reduction of 54.3% in comparison to the virgin material. When 1.0 wt % of the ammonia post treating gloss reducing agent was combined with 99.0 wt % TGIC Polyester 39/80010, the resulting gloss was 1.0, representing a 98.8% reduction from the virgin material gloss. When 1.0 wt % of the ammonia treated silica was combined with 99.0 wt % TGIC Polyester 39/80010, the resulting gloss measurement was 1.0, representing a 98.8% gloss reduction.

EXAMPLE 3G

The deammoniated fumed silica prepared according to Example 3C was combined with TGIC Polyester 39/80010 (0.5 wt % to 99.5 wt %). The resulting gloss measurement was 42, representing a reduction of 50.1%. When a 1.0 wt %/99.0 wt % mixture was prepared and cured, the resulting gloss measurement was 3.7, representing a reduction of 85.0%. The finish had a rough surface with medium to heavy orange peel.

EXAMPLE 3H

The non-deammoniated silica prepared according to Example 3A was combined with TGIC Polyester 39/80010 (1.0 wt % to 99.0 wt %). The resulting cured polymer gloss measurement was 0.5, representing a 99.4% reduction. The finish had a flat textured appearance.

EXAMPLE 4

The non-deammoniated HMDZ treated fumed silica of Example 4A was combined with various powdered polymers to evaluate the resulting gloss levels of the cured polymers. The powered polymers were combined with a gloss reducing agent, applied, cured, and evaluated according to the method set forth in Example 3. The gloss results are reported in Table 1, below.

TABLE 1

| Powdered Polymer | Gloss Reducing Agent | wt % | Gloss | Virgin Powdered Polymer Gloss |
| --- | --- | --- | --- | --- |
| Blue epoxy | Non-deammoniated HMDZ/silica | 0.5 | 73.6 | 80.4 |
| Blue epoxy | Non-deammoniated HMDZ/silica | 1.0 | 69.2 | 80.4 |
| Tiger-Drylac | Non-deammoniated HMDZ/silica | 0.5 | 39 | 58 |
| Epoxy/Polyester (50/50) | Non-deammoniated HMDZ/silica | 0.5 | 40 | |
| TGIC Black Polyester | Non-deammoniated HMDZ/silica | 0.50 | 18 | 85 |

The results show significant gloss reduction as a result of incorporating a flatting agent consisting of the non-deammoniated admixture of HMDZ fumed silica agent into a wide variety of powdered polymers.

EXAMPLE 5

In order to assess the usefulness of using very small particles of metal oxides as fluidization enhancers in powder polymer coatings, we evaluated the fluidization efficiency of powder polymer compositions including fluidization enhancers in a simulation of a production environment. This Example evaluated the stability of the fluidization enhancer containing additive over time in regard to breakdown during reclaim, transfer efficiency and mechanical delivery requirements. In each case, a control material without any fluidization enhancer was included in the evaluations in order to provide a benchmark for reference.

The control powder was TGIC Polyester 39/80040 powdered polymer manufactured by Tiger-Drylac, Inc. The fluidization enhancer used was an HMDZ modified jet milled fumed silica having a mean particle size of about 10 microns. The fumed silica was modified with HMDZ prior to jet milling as described in Example 3A, above. The powdered polymer including the fluidization enhancer consisted of 99.0 wt % powdered polymer and 1.0 wt % fluidization enhancer.

The powders were sprayed with a Nordson® Versa-Spray II 4 nm flat spray nozzle and a Versa-Spray II power pack. The spray gun was operated at 100 KV at a ten inch gun distance. The powder was drawn from a hopper with a twenty five pound capacity. The spray gun drew the powder from the hopper and spray the powder back into the hopper. The attrition results of the two tests are set forth in Tables 2 and 3, below:

TABLE 2

| Control Powder | Virgin Material | Material After 12 Hours |
| --- | --- | --- |
| Average Particle Size | 46.9 microns | 21.3 microns |
| Percent Fines | 14.7 percent | 40.7 percent |
| Percent Over 104 Microns | 5.7 percent | 0.9 percent |
| Percent Under 10 Microns | 6.9 percent | 28.2 percent |

TABLE 3

| Powder With Fluidization Enhancer | Virgin Material | Material After 12 Hours |
| --- | --- | --- |
| Average Particle Size | 46.0 microns | 43.5 microns |
| Percent Fines | 15.7 percent | 18.0 percent |
| Percent Over 104 Microns | 6.1 percent | 5.2 percent |
| Percent Under 10 Microns | 7.7 percent | 10.4 percent |

The considerable improvement in product stability (minimal reduction in average particle size and consistent relationship of over-sized and under-sized particles) demonstrates the reduction in impact fusion that results from the uniform distribution of the fumed silicas as they act as a dry lubricant or glidant (maintain the inter-particle distances) and ease the mechanical transfer characteristics of the material. The reduced abrasion during handling, transfer and application minimizes the changes in performance characteristics which will be seen in properly modified powder coatings. The relative uniformity of particle size distribution over extended reclaim and recycling also indicates an ability to spray material at a significantly higher percentage of reclaim powder to virgin powder without the traditional loss in appearance, application performance, charging characistics and surface uniformity. In addition, with the significant reduction in the generation of fines, filter plugging and other associated mechanical complications which they create are minimized.

EXAMPLE 6

This example evaluates the ability of a fluidization enhancer of this invention to improve the fluidization efficiency of a variety of commercial powder coatings chemistries. Each powder coating composition tested was prepared by combining 0.25 wt % of the HMDZ modified fumed silica fluidizing enhancer described in Example 3A, above, with 99.75 wt % of the powdered polymer identified in Table 4, below. The compositions were evaluated by placing the compositions in a standard fluidization canister and measuring the reduction in air pressure required to double the height of the powder coating in the canister.

Compositions prepare using the same powdered polymers combined 0.25 wt % of a non-jet milled fumed silica having a surface area of 200 $m^2/g$ are reported for comparison purposes.

TABLE 4

| Powder Chemistry | Additive | Fluidization Pressure (psi) |
|---|---|---|
| Epoxy/polyester | None | 40 |
| Epoxy/polyester | 0.25 wt % fluidization enhancer | 5 |
| Epoxy | None | 37.7 |
| Epoxy | 0.25 wt % fluidization enhancer | 6.1 |
| Polyester | None | 46.6 |
| Polyester | 0.25 wt % fluidization enhancer | 7.3 |

With each powdered polymer, the addition of very small amount of fluidization enhancer significantly improved fluidization efficiency.

We claim:

1. A powder coating composition comprising:
   at least one powdered polymer; and
   a metal oxide, wherein the metal oxide has been size-reduced to a mean agglomerate particle size of less than about 25 microns.

2. The powder coating composition of claim 1 wherein the metal oxide has a mean particle size of less than about 15 microns.

3. The powder coating composition of claim 1 wherein the metal oxide is selected from the group including silica, alumina, ceria, germania, titania, zirconia, zinc oxide and mixtures thereof.

4. The powder coating composition of claim 3 wherein the metal oxide is fumed silica.

5. The powder coating composition of claim 1 wherein the metal oxide is present in the composition in an amount ranging from about 0.05 to about 3.0 wt %.

6. The powder coating composition of claim 1 wherein the metal oxide is present in the composition in an amount ranging from about 0.1 to about 0.5 wt %.

7. The powder coating composition of claim 1 wherein the metal oxide includes at least one modifying agent.

8. The powder coating composition of claim 7 wherein the modifying agent is selected from volatilizable hydrocarbons, ammonia, water, gases, and mixtures thereof.

9. The powder coating composition of claim 1 wherein the metal oxide is treated with a hydrophobing agent.

10. The powder coating composition of claim 9 wherein said hydrophobing agent is selected from the group consisting of organopolysiloxanes, organosiloxanes, organosilazanes, organosilanes, halogenorganopolysiloxanes, halogenorganosiloxanes, halogenorganosilazanes, halogenorganosilanes, and mixtures thereof.

11. The powder coating composition of claim 10 wherein said hydrophobing agent is a dimethyldichlorosilane, trimethoxysilane, hexamethyldisilazane, polydimethylsiloxane, and mixtures thereof.

12. A powder coating composition comprising:
   from about 99.5 to about 99.9 wt % at least one powdered polymer; and
   from about 0.1 to about 0.5 wt % of the reaction product of fumed silica and hexamethyldisilazane, wherein the reaction product has been size-reduced to a mean agglomerate particle size of less than 10 microns.

13. The powder coating composition of claim 12 wherein the fumed silica further includes a volatilizable agent.

14. A powder coating composition comprising:
   at least one powdered polymer; and
   the non-deammoniated reaction product of at least one metal oxide and hexamethyldisilazane, wherein the reaction product has been size-reduced to a mean agglomerate particle size of less than about 25 microns.

15. The powder coating composition of claim 14 wherein the metal oxide has a BET surface area of between about 50 $m^2/g$ and about 400 $m^2/g$.

16. The powder coating composition of claim 14 wherein the metal oxide has a mean particle size between about 0.05 μm to about 200 μm.

17. The powder coating composition of claim 14 wherein the metal oxide is selected from the group including alumina, ceria, germania, silica, titania, zirconia, zinc oxide and mixtures thereof.

18. The powder coating composition of claim 17 wherein the metal oxide is silica.

19. The powder coating composition of claim 18 wherein the metal oxide is fumed silica.

20. The powder coating composition of claim 14 wherein the metal oxide is reacted with from about 0.5 to about 40.0 wt % hexamethyldisilazane.

21. The powder coating composition of claim 14 wherein the non-deammoniated reaction product of at least one metal oxide and hexamethyldisilazane is present in the composition in an amount ranging from about 0.1 to about 2.0 wt %.

22. The powder coating composition of claim 14 wherein the non-deammoniated reaction product of at least one metal oxide and hexamethyldisilazane is present in the composition in an amount ranging from about 0.5 to about 1.0 wt %.

23. A powder coating composition comprising:
   from about 98 to about 99.9 weight percent of at least one powdered polymer; and
   from about 0.1 to about 2.0 weight percent of a flatting agent that is non-deammoniated reaction product of from about 80.0 to about 99.9 weight percent fumed silica and from about 0.1 to about 20.0 weight percent hexamethyldisilazane, wherein the reaction product has been size-reduced to a mean agglomerate particle size of less than about 25 microns.

* * * * *